455-617 AU 263 EX
8/25/87 XR 4,689,827

United States Patent [19]
Gurney, Jr.
[11] Patent Number: 4,689,827
[45] Date of Patent: Aug. 25, 1987

[54] PHOTOFLUIDIC AUDIO RECEIVER

[75] Inventor: John O. Gurney, Jr., Kensington, Md.

[73] Assignee: The United States of America as represented by the Secretary of the Army, Washington, D.C.

[21] Appl. No.: 784,145

[22] Filed: Oct. 4, 1985

[51] Int. Cl.[4] .......... H04B 9/00

[52] U.S. Cl. .......... 455/614; 137/828; 455/617; 455/619

[58] Field of Search .......... 137/1, 819-821, 137/827, 828, 835, 826, 840; 455/602, 614, 611, 613, 609

[56] References Cited

U.S. PATENT DOCUMENTS

| | | | |
|---|---|---|---|
| 241,909 | 5/1881 | Bell et al. | 455/614 |
| 3,425,430 | 2/1969 | Horton | 137/81.5 |
| 3,493,760 | 2/1970 | Hoadley | 455/602 |
| 4,512,371 | 4/1985 | Drzewiecki et al. | 137/828 |

OTHER PUBLICATIONS

Kleinman and Nelson, "The Photophone an Optical Telephone Receiver", 6-76, 1482-1494.
Nelson, Wecht and Kleinman, "Photophone Performance", 7-76, 251-256.
Kleinman and Nelson, "Photophone-Physical Design", 7-76, 240-250.
All of the Above from Journal of Acoustic Soc. Am. vol. 59-60.
Drzewiecki, "Fluidic Audio Intercom", 1980 20th Anniversary of Fluidics Symposium, ASME, pp. 89-94.
Gurney, "Fluidic Interface", 3-84, Journal of Dynamic Systems, Management & Control, vol. 106, pp. 90-97.
Gosch, "Light Powered Phone Operates without an Internal Light Source", 5-10-79, Electronics vol. 52, No. 10, pp. 39-40.

*Primary Examiner*—Joseph A. Orsino, Jr.
*Assistant Examiner*—Leslie Van Beek
*Attorney, Agent, or Firm*—Saul Elbaum; Thomas E. McDonald; Alan J. Kennedy

[57] ABSTRACT

A photofliudic audio receiver for producing sound directly from light modulated at audio frequencies and amplifying the sound to deliver uniform frequency response over a wide audio frequency range, utilizing only fluidic and thermal devices. It includes a photoacoustic cell for converting the modulated light signal to an acoustic signal, and at least one laminar proportional amplifier (LPA) for amplifying the acoustic signal to provide the sound output of the receiver. Each LPA has a rising frequency response over the wide audio frequency range, to thus offset the inherent falling frequency response of the photoacoustic cell. The receiver may have several amplifying stages, each stage including several LPA's connected in parallel. The receiver may also include acoustic highpass filters connected in series with the LPA inputs or outputs to accentuate the rising frequency response of the LPA's. The sound output of the receiver can be fed to acoustic terminating devices such as headphones or an exponential horn.

17 Claims, 13 Drawing Figures

PHOTOFLUIDIC AUDIO RECEIVER

RIGHTS OF THE GOVERNMENT

The invention described herein may be manufactured, used and licensed by and for the U.S. Government for governmental purposes without payment to me of any royalties thereon.

BACKGROUND OF THE INVENTION

The invention applies generally to an apparatus for producing sound from light modulated at audio frequencies. More particularly, the invention relates to a photofluidic audio receiver which not only converts the light to sound but also amplifies the sound, and which delivers a flat frequency response over a preselected audio frequency range.

It is known in the prior art to use a photodiode to receive an optical signal and convert it to an electrical signal, which can then be amplified and used to power a conventional speaker or headset. However, this known scheme is sensitive to environmental hazards because the photodiode can become inoperative or be destroyed in the presence of electromagnetic radiation, extreme temperatures, or shock. Also, this scheme requires the use of electrical power, which can pose a safety hazard when the receiver is located in an environment, such as a coal mine, in which explosive gases may be present.

In a lead article entitled "The photophone—an optical telephone receiver", by D. A. Kleinman and D. F. Nelson, and two subsequent articles, published in the Journal of the Acoustical Society of America, Vol. 59, No. 6, June 1976, pages 1482–1494, and Vol. 60, No. 1, July 1976, pages 240–255, an optical telephone receiver employing the opto-acoustic effect is described. This receiver consists of an absorption cell, a response-equalizing device such as a gas column or diaphragm, a tapered acoustic tube acting as a transformer, and an earpiece similar to a conventional telephone earpiece including a response-equalizing device consisting of a diaphragm and screen. By use of these response-equalizing devices, this receiver gives a flat (3-dB) response to intensity modulated light over the telephone voice band 300–3300 Hz. This receiver is powered solely by the optical signal applied to it, and thus is suitable for use in a hazardous environment. However, its sound output will be limited by the power of the optical signal supplied to it, generally only a few milliwatts.

It is known in the prior art to use a laminar proportional amplifier (LPA) to amplify human speech. In a paper entitled "A Fluidic Audio Intercom" by T. M. Drzewiecki, 20th Anniversary of Fluidics Symposium, ASME, 1980, pages 89–94, a fluidic audio intercom suitable for use in a combat vehicle is described, in which a laminar proportional amplifier has an input connected to receive normal speech sound waves, and its outputs connected by air filled tubing to an airline head set. However, harmonic distortion and resonance in the air filled tubing limit the use of this system to distances of only a few meters.

In an article entitled "Photofluidic Interface" by J. O. Gurney, Jr., Journal of Dynamic Systems, Measurement, and Control, March 1984, Vol. 106, pages 90–97, and in U.S. Pat. No. 4,512,371, issued Apr. 23, 1985 to Drzewiecki et al., there is described a photofluidic interface for transducing optical control signals into fluid control pressures, in which a light source modulated at a predetermined frequency is utilized to transmit control signals to a photoacoustic cell that absorbs the light energy and converts it to heat energy to create pressure pulses within the cell. The output signal of the photoacoustic cell is then fluidically amplified by a laminar proportional amplifier, fluidically rectified by a fluidic rectifier, and again fluidically amplified by one or more LPA's to create a pneumatic or hydraulic output pressure which drives an actuator. The output pressure can be controlled by modulating the amplitude, pulse width, frequency, or gate width of the optical input signal.

OBJECTS AND SUMMARY OF THE INVENTION

It is a primary object of the invention to provide an apparatus for producing sound directly from light modulated at audio frequencies and amplifying the sound to deliver uniform (flat) frequency response over a predetermined audio frequency range, utilizing only fluidic and thermal devices.

It is a further object of the invention to provide such an apparatus for use with fiber optic audio transmission systems.

A photofluidic audio receiver, according to the invention, includes at least two sections. The first, or input section, is a photoacoustic cell, which is arranged to receive a light signal modulated at audio frequencies and convert this modulated light signal to an acoustic signal. The second section is a one stage fluidic amplifier including at least one proportional amplifier having an input connected to receive and amplify the acoustic signal produced by the photoacoustic cell of the first section. The photofluidic audio receiver may also have a third section which includes one or more stages of laminar proportional amplifiers which are connected to receive and further amplify the acoustic output signal of the second section. The output of the receiver can be fed to various acoustic terminations such as a set of airline passenger sound headphones or an exponential horn radiating its sound to free space.

The sound pressure amplitude of the acoustic signal generated by the photoacoustic cell of the first section decreases as the frequency of the modulating audio signal increases. Therefore, the laminar proportional amplifiers in the second and third sections of the receiver are designed such that the sound pressure amplitude of the output acoustic signal increases as the frequency of the input acoustic signal increases, to thus offset to some extent the falling response of the photoacoustic cell and provide a flatter overall frequency response in the acoustic output signal of the receiver.

Further shaping of the receiver frequency response can be accomplished by connecting acoustic high pass filters in series with the LPA inputs/outputs, as described hereinafter, to accentuate the rising response of the LPAs.

Also, the photofluidic system ahead of the receiver or the acoustic system behind the receiver can be designed to achieve an even flatter receiver frequency response. For example, the output of the modulated light source can be shaped electronically to control the frequency response of the circuit driving the light source. Also, a series inductance or a resonant tube can be connected to the receiver output to boost the frequency response at selected higher frequencies.

BRIEF DESCRIPTION OF THE DRAWINGS

These and other objects and features of the invention will become more apparent from the following detailed description of the preferred embodiments, taken in conjunction with the drawings, in which.

DESCRIPTION OF THE PREFERRED EMBODIMENTS

Figure 1:
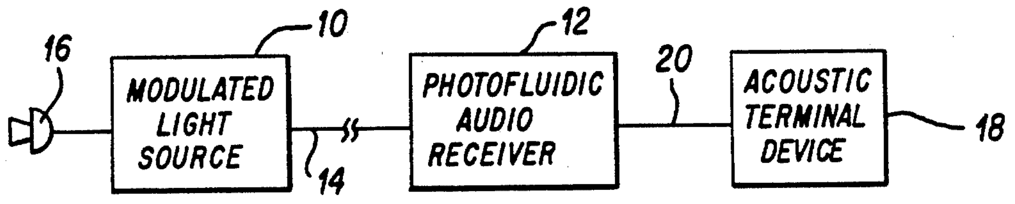
FIG. 1 is a block diagram of a fiber optic audio transmission system, according to the invention.

In the system shown in FIG. 1, a modulated light source 10, such as a laser or LED is connected to a photofluidic audio receiver 12 at a remote receiving station by a fiber optic transmission line 14. Voice or other audio frequency sound signals at the receiving station are transduced by a microphone 16 to modulate the intensity of the light source 10. For example, the light source 10 may be a gallium arsenide solid state laser whose electrical current input is modulated by the microphone 16. The modulated optical signal generated by the light source 10 is transmitted through the optical fiber 14 to the remote receiving station, where it is converted to sound by the photofluidic audio receiver 12 and supplied to an acoustic termination device 18 by an acoustic transmission line 20. Examples of various acoustic termination devices which may be utilized include a set of airline passenger sound headphones, or a small cavity enclosing the head of a listener, or an exponential horn radiating sound to free space.

Figure 2:
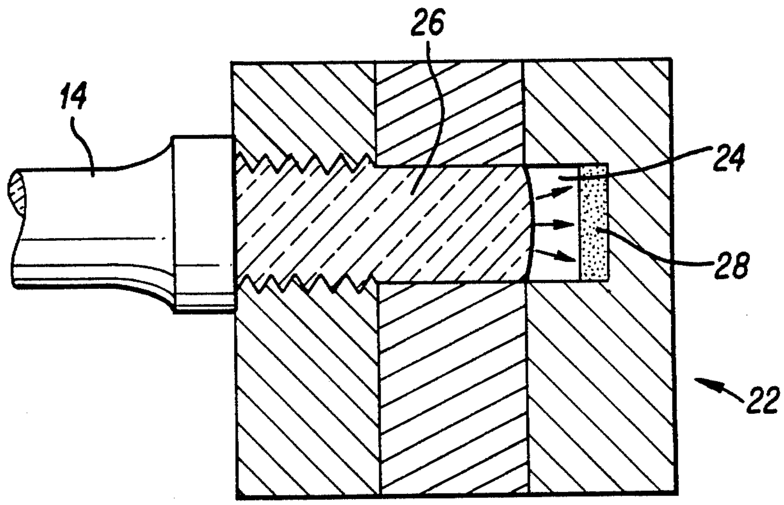
FIG. 2 is a cross-sectional side view of a photoacoustic cell having an input connected to one end of an optical fiber.

The photofluidic audio receiver 12 includes a photoacoustic cell 22, which is similar to that described in the above-referenced U.S. Pat. No. 4,512,371 and which is shown in FIG. 2. The photoacoustic cell 22 includes an air-filled cell 24 which is closed on one side by a transparent optical connector 26 connected to the optical fiber 14. A target 28 of light absorbing material, such as carbon black, is disposed on the wall of the cell 24 opposite the optical connector 26, so that most of the light energy transmitted through the optical connector 26 from the optical fiber 14 falls on the target 28. The target 28 absorbs the light energy and converts it to heat energy, thereby raising the temperature of the target material. By thermal diffusion, this rise in the temperature of the target material also raises the temperature of a layer of air adjacent to the target surface. In a closed cell volume, a modulated light, will by this mechanism, create pressure modulations within the cell 24. The sound pressure amplitude created within the cell 24 can be optimized by properly choosing the target material, target thickness, cell depth, and cell volume. For a given modulated energy, target and cell construction, there is a given acoustic current, i.e., volume flow of air, present within the fluid at the target surface. The amplitude of this acoustic current is proportional to the amplitude of the optical power input.

Figure 3:
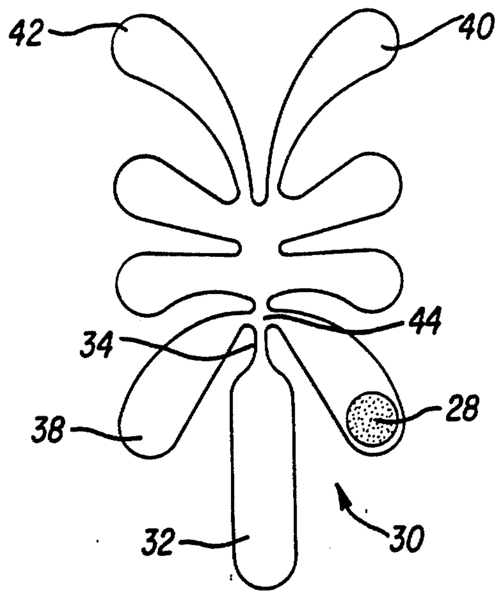
FIG. 3 is plan view of a single stage fluidic amplifier that amplifies the output of the photoacoustic cell of FIG. 1.

The second section of the photofluidic audio receiver 12 is a single stage fluidic amplifier including at least one laminar proportional amplifier 30, which is similar to that described in U.S. Pat. No. 4,512,371 and which is shown in FIG. 3 herein. The laminar proportional amplifier 30 includes a supply pressure input 32, a power jet nozzle 34, two control inputs 36, 38 and two outputs 40, 42.

By connecting one control input 36 of the fluidic amplifier 30 to the photoacoustic cell 22, the photoacoustic current generated in the photoacoustic cell becomes the acoustic signal driving the amplifier 30. The photoacoustic cell becomes, in effect, a photofluidic cell because the power jet issuing from the nozzle 34, now forms an acoustic impedance at the opening of the cell at the control region 44. The photoacoustic alternating current creates an alternating pressure at the fluidic amplifier control region 44 caused by the coupling of the acoustic current and the jet impedance. This pressure is then amplified by the amplifier 30. The other control input 38 to the LPA 30 is opened to ground. Thus the LPA 30, which is a push-pull, dual input type amplifier, will be driven by the photoacoustic signal entering only the one input 36.

The photoacoustic cell 22 can be constructed intergal with the LPA control input 36 by disposing the light absorbing material forming the target 28 on one wall of the control input 36, as shown in FIG. 3, and directing the photoacoustic signal from the fiber optic 14 to the target 28 through an opening in an opposite wall of the control input 36. Thus, the LPA control input 36 also comprises the air filled cell 24 of the photoacoustic cell 22.

A design goal for any useful photofluidic audio receiver would be to deliver a flat or uniform frequency response over the audiable range or some useful portion of the audiable range. For voice communication, the highest required frequency is about 3,000 Hz.

Figure 4:
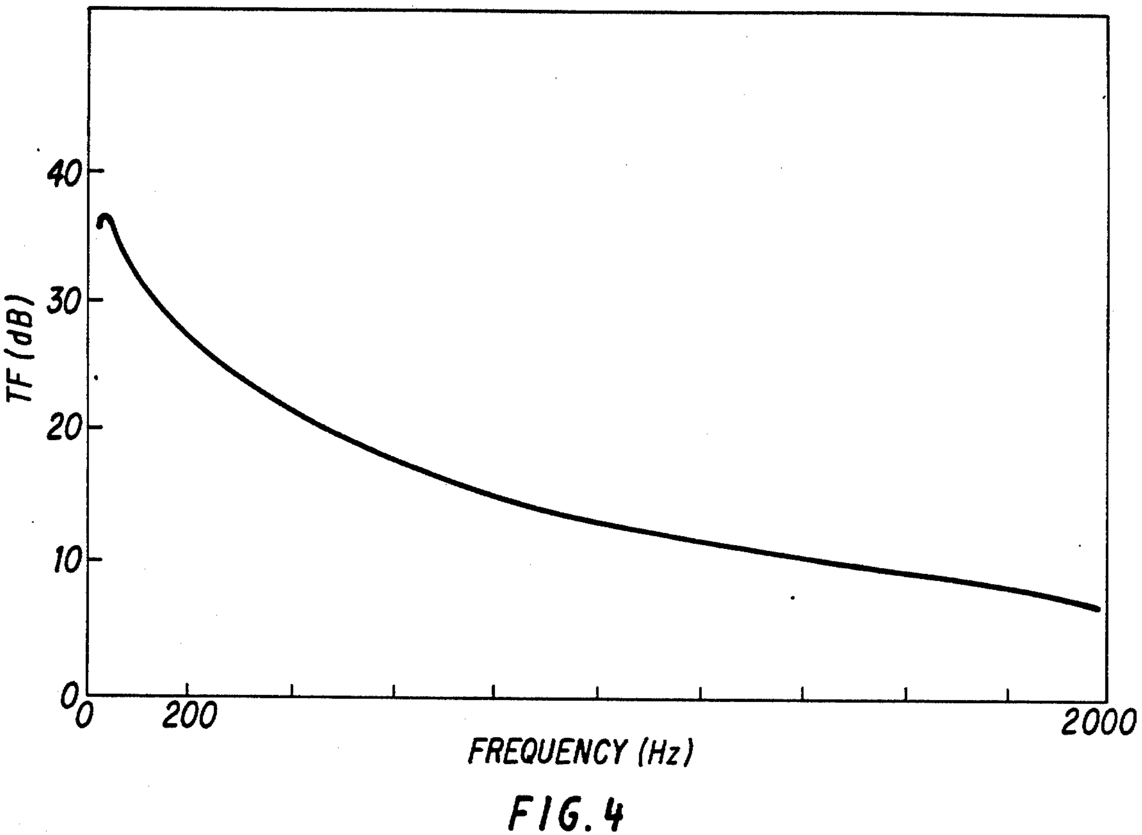
FIG. 4 is a graph showing the frequency response of a typical closed photoacoustic cell.

Both theoretical analysis and experimental results indicate that the frequency response of a closed photoacoustic cell will have a transfer function TF (sound pressure level amplitude divided by the modulated optical power amplitude) which is an inverse function of the frequency, as shown in the typical experimental curve of FIG. 4 for a closed photoacoustic cell of 0.091 inch diameter.

Figure 5:
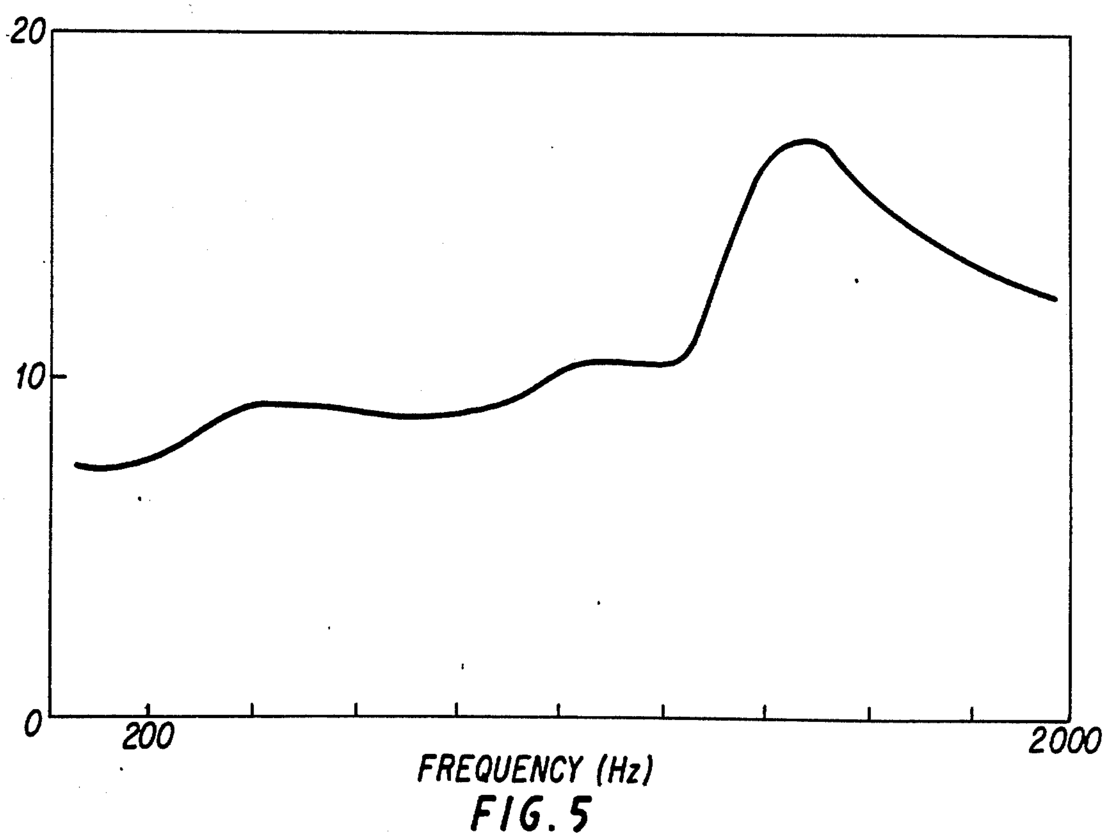
FIG. 5 is a graph showing the pressure gain frequency response of a laminar proportional amplifier.
Figure 6:
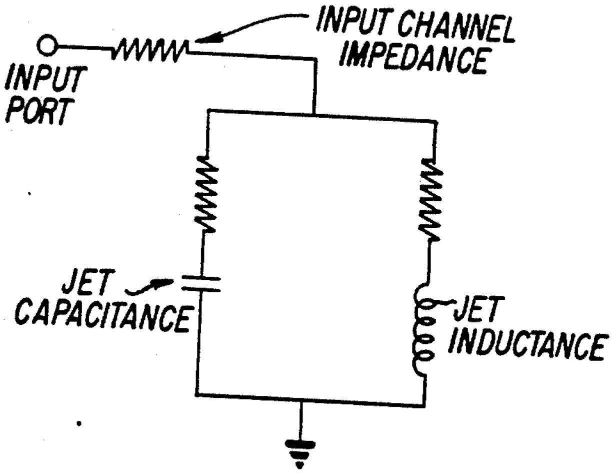
FIG. 6 is an equivalent circuit or model for a typical LPA input impedance.
Figure 7:
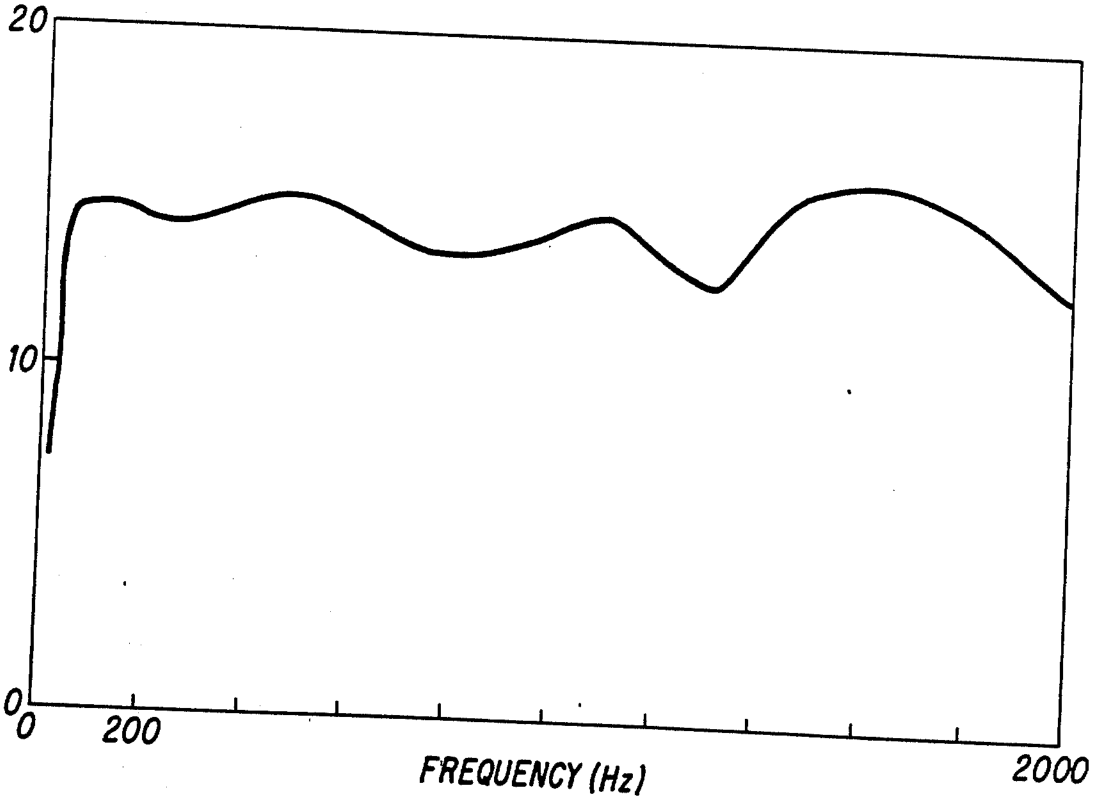
FIG. 7 is a graph showing the frequency response of a photofluidic audio receiver, according to the invention.

On the other hand, various laminar proportional amplifiers have a pressure gain frequency response that increases with the frequency, as shown by the experimental curve of FIG. 5 for a C-Format LPA with blocked inputs and outputs, having a nozzle width of 0.015 inch, a depth of 0.01 inch, and a supply pressure of 22.3 Torr. This rising response can be attributed to acoustic induction in the equivalent circuit respresenting LPA input impedance, as shown in FIG. 6, as well as to internal feedback. Thus, when the acoustic output signal of a photoacoustic cell is supplied to an input of such a laminar proportional amplifier, the rising response of the laminar proportional amplifier might be hoped to offset, to some extent, the falling response of the photoacoustic cell, thereby tending towards a more flat overall response. It has been discovered that this effect occurs in some instances, for example as shown in the frequency response curve of FIG. 7, which is flat within plus or minus 2 dB from 200 Hz to 2000 Hz, for a photofluidic audio receiver consisting of (1) a C format LPA with blocked inputs and outputs, having a nozzle width of 0.015 inch, a depth of 0.010 inch, and a supply pressure of 22.3 Torr, and (2) a closed photoacoustic cell (0.091 inch diameter) disposed in one input of the LPA.

Figure 8:
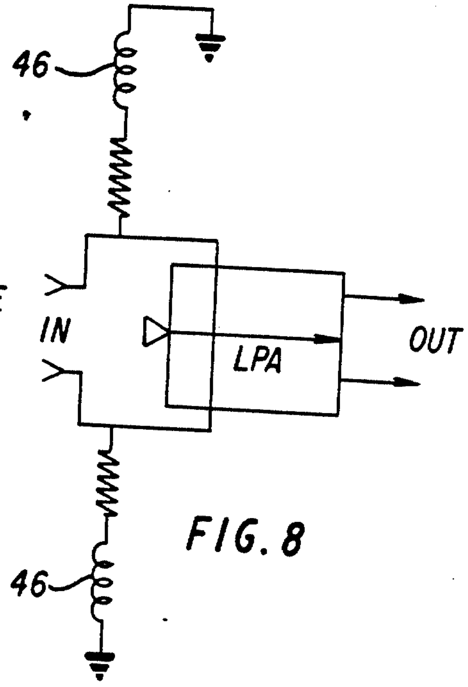
FIG. 8 is a schematic diagram of a laminar proportion amplifier, showing inductive branch shunts connected in series with the LPA inputs.

Further shaping of the receiver frequency response could be accomplished by connecting acoustic highpass filters in the form of inductive branch shunts 46 in series with the LPA inputs, as shown in FIG. 8. For example, a small tube connecting an LPA input to ground could form such an inductive shunt. This will accentuate the rise in frequency response of the laminar proportional amplifier.

The upper limit (highest useful frequency) of the bandpass $f_{bw}$ of a laminar proportional amplifier is determined by the velocity of the LPA powered jet. The higher the jet velocity, the higher the upper frequency limit.

This conclusion is based on the following elementary considerations. The influence of an acoustic input signal is largely confined to the LPA control region 44 (FIG. 3) where the influence of any input pressure is integrated along the jet axis. Therefore, the transport time across the control region 44 of the fluid particles in the powered jet must be shorter than the period of the input signal. Thus $$f_{bw} \sim \bar{u}/b_c \quad (1)$$

where bc=width of control region (along jet axis)

$\bar{u}$=average velocity of jet

The average velocity of a jet issuing from a nozzle is proportional to the free stream (or Bernouli) velocity, $u_B$, where $$u_B = \left(\frac{2P_s}{\rho}\right)^{\frac{1}{2}} \quad (2)$$

where $P_s$=nozzle supply pressure $\rho$=density of fluid

Thus $$f_{bw} \sim \left(\frac{2P_s}{\rho}\right)^{\frac{1}{2}} / b_c \quad (3)$$

and for a given LPA, one increases bandwidth by increasing supply pressure. However, it is standard practice to limit the supply pressure to any LPA so that a scaled Reynolds number, $\sigma N_R$, does not exceed an upper bound of about 1200. Otherwise, the LPA jet will become turbulent (creating noise) and will be less useful for sound amplification.

$$N_R = b_c \frac{(2P_s/\rho)^{\frac{1}{2}}}{\nu} \quad (4)$$

where $\sigma = h_s/b_s$=aspect ratio $h_s$=nozzle height $b_s$=nozzle width $\nu$=kinematic viscosity of fluid This requires that $$\frac{\sigma b_s}{\nu}\left(\frac{2P_s}{\rho}\right)^{\frac{1}{2}} = 1200 \quad (5)$$

Combining equations (5) and (3)

$$f_{bw} \sim \frac{\nu}{h_s b_c} \quad (6)$$

In a standard LPA, $b_c = b_s$ so that $$f_{bw} \sim \frac{\nu}{\sigma b_s 2} = \frac{\nu}{h_s b_s} \quad (7)$$

Bandwidth will then increase with smaller LPA elements (which have smaller nozzles) and shallower aspect radios. Viscous losses within the LPA limit useful aspect ratios to >0.3 or 0.4. The smaller LPA's are presently commercially available with $b_s$=0.020", 0.015", 0.010" and 0.006".

Tests of a single LPA with $b_s$=0.015" and $\sigma$=0.75 show that pressure gain rolls off at about 2000 Hz, as shown in FIG. 5. Thus, it is seen that there are commercially available LPA's which should be suitable for use in the photofluidic audio receiver as described herein.

Figure 9:
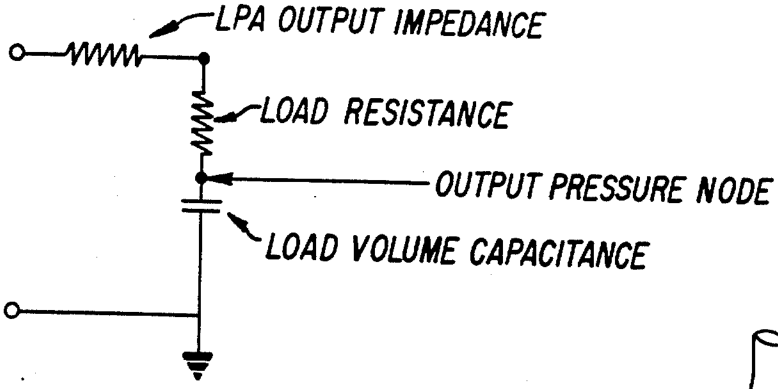
FIG. 9 is a schematic diagram showing the load circuit of a typical laminar proportion amplifier.
Figure 11:
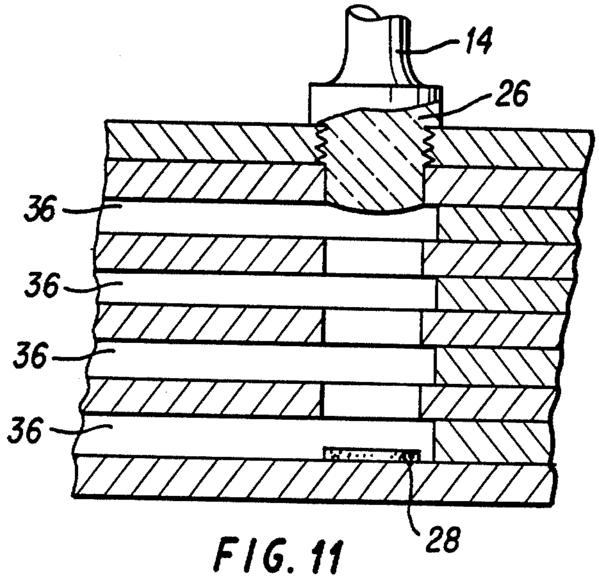
FIG. 11 is a cross-sectional side view of a photoacoustic cell formed integral with four LPA control inputs.
Figure 10:
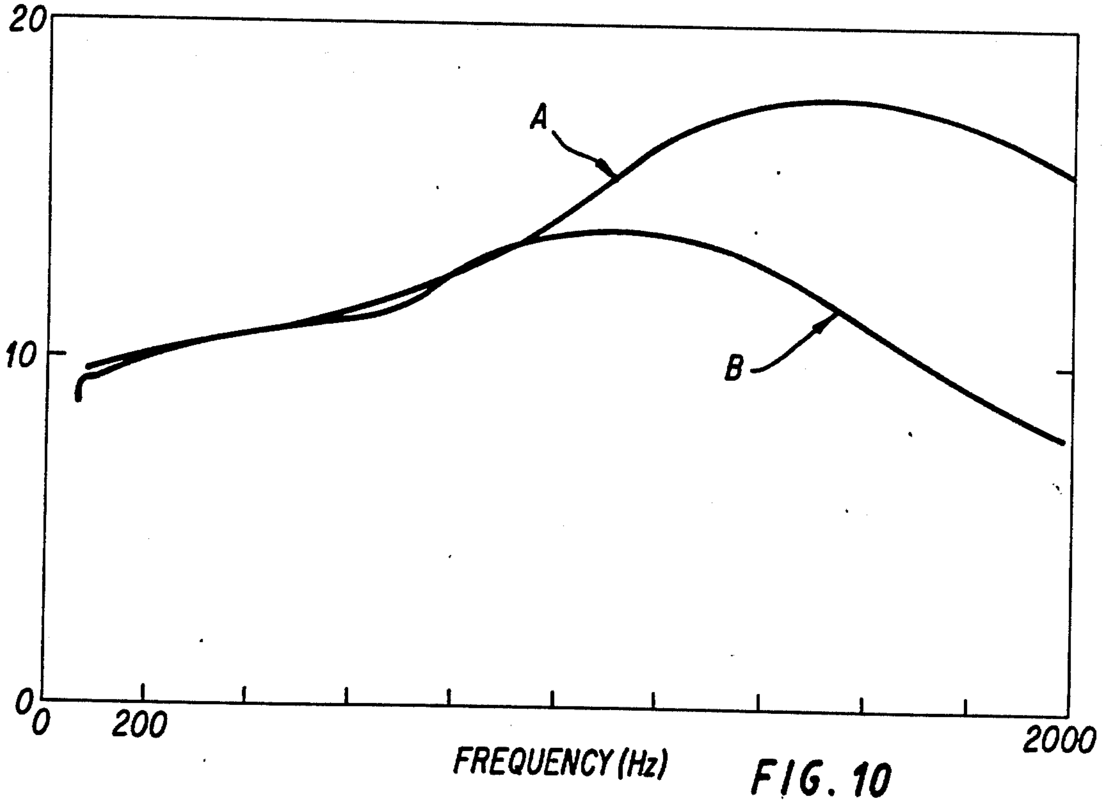
FIG. 10 is a graph showing the frequency response of a photofluidic amplifier which includes four LPAs connected in parallel.

The above discussion applies to LPA's that are truly block loaded, i.e., feeding infinite load impedance. In practice, block loading is seldom achievable or desirable. A normal LPA gain block, including vent plates, transfer plates and cover plates, will necessarily include a small volume at the LPA output. Thus, the LPA will feed a capacitive load. Connection of the LPA audio receiver to a listener's ear or to tubular headphones will contribute additional capacitance to the LPA load. FIG. 9 is a simplified schematic of the load circuit. For a given load condition the bandpass of a small sized, inherently higher bandpass LPA will be diminished. To improve this situation, several LPA's can be connected in parallel to drive more power into the load volume. The frequency response curves A and B for four parallel C-format LPA's (0.015" nozzle width, 0.010" depth, and 22.3 Torr supply pressure) feeding two different load volumes appear in FIG. 10. The Curve A load volume is 0.25" diameter×0.126" deep, and the Curve B load volume is 0.25" diameter×0.255" deep. Curve B demonstrates that the system described herein can deliver a nearly flat frequency response (±2 dB up to 2000 Hz) to a load volume comparable to the auditory canal of a human ear. The photoacoustic cell 22 is also formed integral with the four LPA's 30, as shown in FIG. 11 herein. The four LPA's 30 are disposed in parallel, one on top of the other, with the control inlets 36 being connected by a common passage which also serves as the air filled cell 24 of the photoacoustic cell. The optically transparent member 26 connected to the optical fiber 14 extends into the top of this opening 24, and the light absorbing material forming the target 28 is disposed on the bottom plate of the assembly to receive the photoacoustic signal transmitted through the optical fiber 14.

Figure 12:
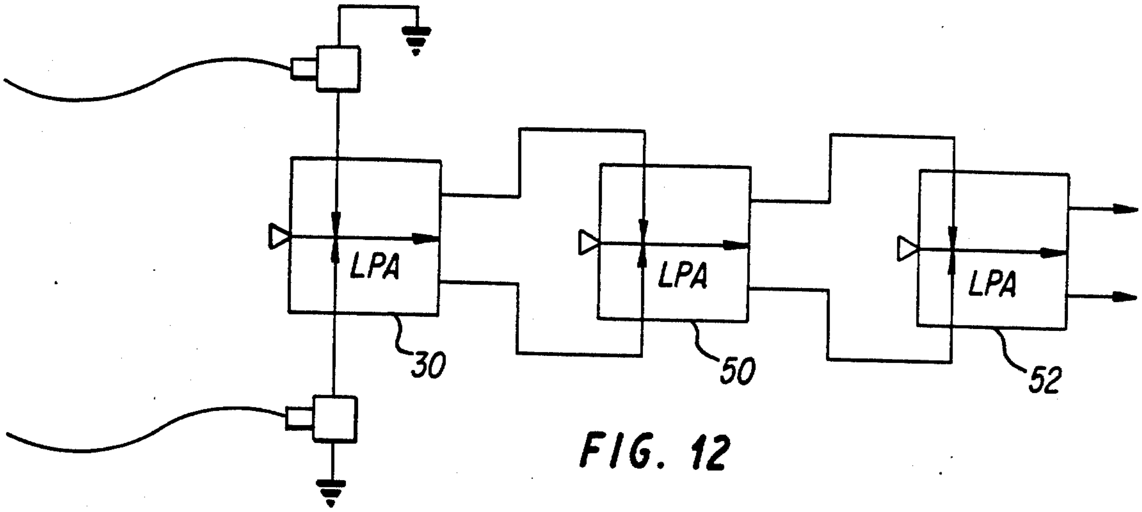
FIG. 12 is a schematic cross-sectional diagram of a preferred embodiment of the invention, having multistage fluidic amplification of the output pressure of the photoacoustic cell.

The photofluidic audio receiver 12 may also have a third output section including one or more stages of fluidic amplifiers, to achieve the necessary sound level pressure gain, sound power gain, and/or impedance matching for the particular acoustic termination device 18 connected to the output of the receiver 12. For example, the photofluidic audio receiver shown in FIG. 12 includes a third section including two laminar proportional amplifiers 50, 52 connected in series arrangement to the output of the first laminar proportional amplifier 30.

Figure 13:
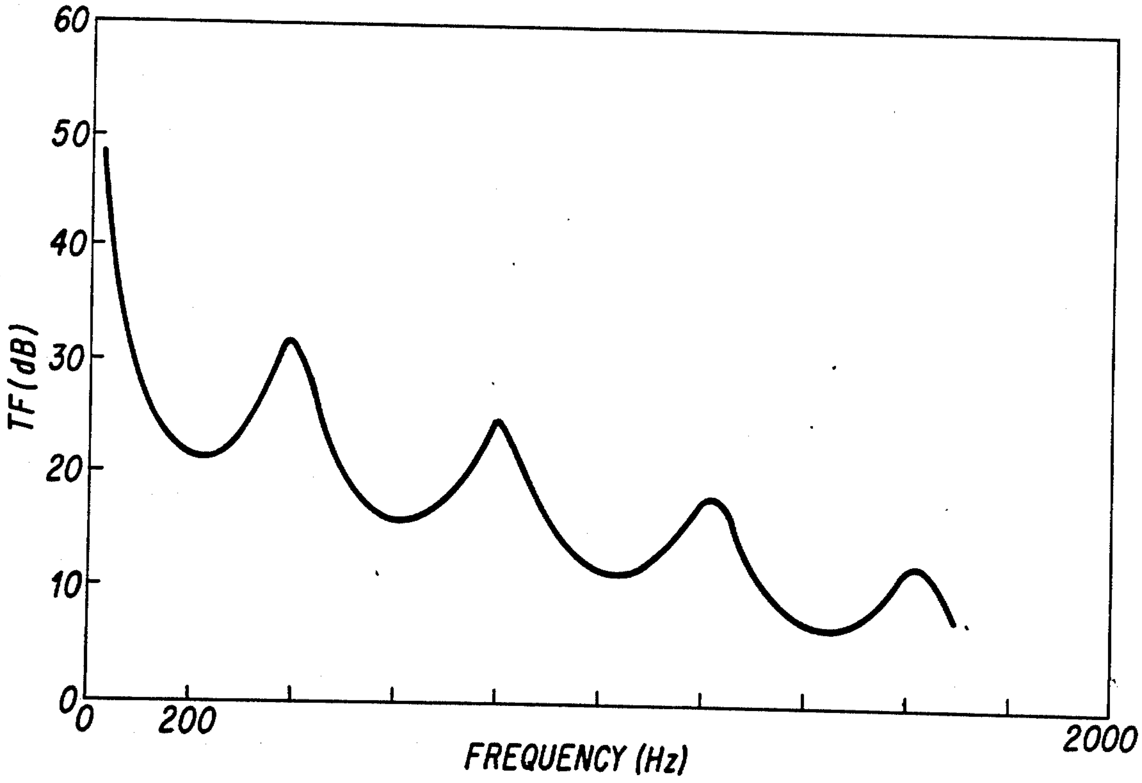
FIG. 13 is a graph showing the frequency response of a photofluidic receiver having a resonant tube connected to each receiver output.

Another acoustical compensating scheme uses either a series inductance or a resonant tube or both connected to the output of the photofluidic amplifier 12. Tests of a photofluidic audio receiver 12 using three series connected C-format LPA stages ($b_s$=0.010", $\sigma$=0.5 $P_s$=80 Torr) driving a 14.5 inch long 0.130 diameter tube at each output gave the resonant frequency response shown in FIG. 13. As shown in this figure, resonances in the output tube boost the response at selected higher frequencies. Although the small ($b_s$=0.010") LPA's are poorly matched to the load, this arrangement produced a clearly intelligible output when the laser light source was modulated with recorded music.

Since there are many variations, modifications, and additions to the preferred embodiments described herein which would be obvious to one skilled in the art, it is intended that the scope of the invention be limited by only the appended claims.

What is claimed and desired to be secured by Letters Patent of the United States is:

1. A photofluidic audio receiver, comprising:

photoacoustic means for converting a light signal modulated with an audio signal into an alternating acoustic current, the photoacoustic means having a falling frequency response, i.e., the amplitude of the alternating acoustic current generated by the photoacoustic means decreases as the frequency of the modulating audio signal increases, the photoacoustic means including a closed fluid-filled cell, a transparent member extending through one wall of the cell to receive and direct the modulated light signal into the cell, and fluidic amplifying means comprising a first amplifying stage having first and second outlets and a laminar proportional amplifier (LPA) including power jet means, including a nozzle, for issuing a continuous fluid stream under pressure from the nozzle, the nozzle having a width in the range of 0.013 inches to 0.017 inches and a height in the range of 0.008 inches to 0.012 inches, first and second outputs arranged to accept fluid from the stream differentially, the first and second outputs being connected respectively to the first and second outputs of the first stage, and control means for diverting the stream to vary the quantity of fluid received at each output, including a first control port, which is in communication with and blocked by the fluid-filled cell, for directing the alternating current generated by the photoacoustic means against one side of the stream, wherein the dimensions and operating parameters of the first stage LPA are selected such that the LPA has a rising frequency response which offsets the falling frequency response of the photoacoustic means to provide a frequency response which is flat within plus or minus 2 dB over an audio frequency range of 200 Hz to 2000 Hz.

2. A photofluidic audio receiver, as described in claim 1, wherein the transparent member of the photoacoustic means comprises an optical fiber.

3. A photofluidic audio receiver, as described in claim 1, which further comprises at least one additional amplifying stage having first and second outlets and having first and second inlets connected respectively to the first and second outlets of the preceeding stage, each additional stage including at least one LPA which comprises:

power jet means for issuing a continuous fluid stream under pressure;

first and second outputs arranged to accept fluid from the stream differentially, the first and second outputs being connected respectively to the first and second outlets of the additional stage; and control means for diverting the stream to vary the quantity of fluid received at each output, including first and second control inputs disposed on opposite sides of the stream and connected respectively to the first and second inlets of the additional stage;

wherein the dimensions and operating parameters of the at least one LPA of each additional stage are selected such that the additional stage has a rising frequency response over the predetermined audio frequency range.

4. A photofluidic audio receiver, as described in claim 3, wherein each additional stage further comprises an acoustic highpass filtering means for accentuating the rising frequency response of the additional stage.

5. A photofluidic audio receiver, as described in claim 4, wherein the acoustic highpass filtering means comprises two inductive branch shunts, respectively disposed in series with the two inlets of the additional stage.

6. A photofluidic audio receiver, as described in claim 4, wherein the acoustic highpass filtering means comprises two inductive branch shunts, respectively disposed in series with the two outlets of the additional stage.

7. A photofluidic audio receiver, as described in claim 3, further comprising two resonant tubes disposed respectively in series with the two outlets of the last stage.

8. A photofluidic audio receiver, as described in claim 1, wherein the first stage LPA has a nozzle width of 0.015 inches and a nozzle height of 0.010 inches.

9. An audio transmission system, comprising:

light generating means for generating a light signal modulated by an audio signal;

light transmission means including an optical fiber having one end disposed to receive the modulated light signal generated by the light generating means and having an opposite end; and a photofluidic audio receiver, comprising a light energy converting means disposed at the opposite end of the optical fiber for producing sound directly from the modulated light signal, and sound amplifying means for fluidically amplifying the sound produced by the light energy converting means;

wherein the light energy converting means comprises a closed fluid-filled cell having a wall through which the opposite end of the optical fiber extends to direct the modulated light signal into the cell, and a target of light-absorbing material disposed within the cell to receive the modulated light signal and convert it into heat energy, which is transferred to adjacent fluid within the cell to create an alternating acoustic current, the light energy converting means inherently having a falling frequency response, i.e., the amplitude of the alternating acoustic current generated within the cell decreases as the frequency of the modulating audio signal increases; and wherein the sound amplifying means comprises a first amplifying stage including a plurality of laminar proportional amplifiers (LPA's) connected in parallel, each first stage LPA including power jet means for issuing a continuous fluid stream under pressure, first and second outputs arranged to accept fluid from the stream differentially, and control means for diverting the stream to vary the quantity of fluid received at each output, the control means including a first control input in communication with the fluid-filled cell for directing the alternating acoustic current generated, within the cell against one side of the stream, the dimensions and operating parameters of the first stage LPA being selected such that the LPA has a rising frequency response within a predetermined audio frequency range, i.e., the sound pressure amplitude of the acoustic output signal at each LPA output increases as the frequency of the alternating acoustic current generated by the light energy converting means increases over the predetermined audio frequency range, to thus offset the falling frequency response of the light energy converting means; and wherein the light energy converting means is formed integral with the plurality of first stage LPA's, the first stage LPA's being disposed one on top of the other, with the first control inputs of the first stage LPA's being connected by a closed common passage which blocks the first control inputs and which also serves as the fluid-filled cell of the light energy converting means.

10. An audio transmission system, as described in claim 9, wherein the light generating means comprises:

a gallium arsenide solid state laser for generating a coherent light signal having an amplitude controlled by an electrical current input to the laser; and a microphone for transducing voice or other audio frequency sound signals to modulate the electrical current input to the laser.

11. An audio transmission system, as described in claim 9, which further comprises:

an acoustic termination device; and an acoustic transmission line, connected between the photofluidic audio receiver and the acoustic termination device, for supplying the sound output of the photofluidic audio receiver to the acoustic termination device.

12. An audio transmission system, as described in claim 11, wherein the acoustic termination device comprises a set of airline passenger sound headphones.

13. An audio transmission system, as described in claim 11, wherein the acoustic termination device comprises an exponential horn radiating sound to free space.

14. A photofluidic audio receiver, comprising:

photoacoustic means for converting a light signal modulated with an audio signal into an alternating acoustic current, the photoacoustic means having a falling frequency response, i.e., the amplitude of the alternating acoustic current generated by the photoacoustic means decreases as the frequency of the modulating audio signal increases, the photoacoustic means including a closed fluid-filled cell, a transparent member extending through one wall of the cell to receive and direct the modulated light signal into the cell, and a target of light-absorbing material disposed within the cell to receive the modulated light signal and convert it into heat energy which is transferred to adjacent fluid to create the alternating acoustic current within the cell: and fluidic amplifying means comprising a first amplifying stage having first and second outlets and including a plurality of laminar proportional amplifiers (LPA's) connected in parallel, each first stage LPA including power jet means for issuing a continuous fluid stream under pressure, first and second outputs arranged to accept fluid from the stream differentially, the first and second outputs being connected respectively to the first and second outlets of the first stage, and control means for diverting the stream to vary the quantity of fluid received at each output, including a first control input, which is in communication with the fluid-filled cell, for directing the alternating acoustic current generated within the cell against one side of the fluid stream;

wherein the first control inputs of the first stage LPA's are blocked by the fluid-filled cell, and the dimensions and operating parameters of the first stage LPA's are selected such that the first amplifying stage has a rising frequency response which substantially offsets the falling frequency response of the photoacoustic means over a predetermined audio frequency range.

15. A photofluidic audio receiver, as described in claim 14, wherein the power jet means of each first stage LPA comprises a nozzle through which the pressurized fluid stream issues, the nozzle having a width of 0.015 inches and a height of 0.010 inches.

16. A photofluidic audio receiver, as described in claim 15, wherein the first amplifying stage includes four LPA's connected in parallel.

17. A photofluidic audio receiver, as described in claim 16, wherein the photoacoustic means is formed integral with the four first stage LPA's, the first stage LPA's being disposed one on top of the other, with the first control inputs of the first stage LPA's being connected by a closed common passage which blocks the first control inputs and which also serves as the fluid-filled cell of the photoacoustic means.

* * * * *